United States Patent
Martin et al.

(10) Patent No.: US 9,509,703 B1
(45) Date of Patent: *Nov. 29, 2016

(54) PROXIMITY BASED DIGITAL RIGHTS MANAGEMENT

(71) Applicant: Sprint Communications Company L.P., Overland Park, KS (US)

(72) Inventors: Geoffrey Scott Martin, Overland Park, KS (US); Michael Philip Dougan, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/555,298

(22) Filed: Nov. 26, 2014

Related U.S. Application Data

(62) Division of application No. 13/358,279, filed on Jan. 25, 2012, now Pat. No. 8,943,605.

(51) Int. Cl.
| | |
|---|---|
| G06F 21/10 | (2013.01) |
| H04L 29/06 | (2006.01) |
| H04W 4/02 | (2009.01) |
| H04W 12/04 | (2009.01) |
| H04W 4/00 | (2009.01) |
| A63F 13/73 | (2014.01) |

(52) U.S. Cl.
CPC ............ *H04L 63/107* (2013.01); *A63F 13/73* (2014.09); *H04W 4/005* (2013.01); *H04W 4/023* (2013.01); *H04W 12/04* (2013.01)

(58) Field of Classification Search
CPC ............... G06F 2209/505; G06F 2221/2111; H04L 9/0872; H04L 63/0492; H04L 63/107; H04W 4/005; H04W 4/023; H04W 12/04
See application file for complete search history.

(56) References Cited

U.S. PATENT DOCUMENTS

| | | | | |
|---|---|---|---|---|
| 8,104,091 | B2* | 1/2012 | Qin | G06F 21/10 726/26 |
| 9,081,942 | B2* | 7/2015 | Gheva | G06F 21/31 |
| 2005/0065891 | A1* | 3/2005 | Lee | G06F 21/10 705/59 |
| 2008/0320560 | A1* | 12/2008 | Casey | H04L 63/10 726/3 |
| 2009/0307759 | A1* | 12/2009 | Schnell | G06F 21/10 726/4 |
| 2013/0174223 | A1* | 7/2013 | Dykeman | G06F 21/10 726/4 |

* cited by examiner

*Primary Examiner* — Jung Kim
*Assistant Examiner* — Carlos M De Jesus Lassala

(57) ABSTRACT

A method, system, and medium are provided for sharing content among network devices. The system includes at least one base station and network devices that are part of a wireless network. The base station is configured to receive a request for content from a network device. The content may be available on a second network device proximate to the first network device. The base station may generate temporary and permanent keys that allow network devices to access content available on other network devices. The base station, among other functions, may transmit keys, determine proximity settings and facilitate content transfers.

20 Claims, 4 Drawing Sheets

PROXIMITY BASED DIGITAL RIGHTS MANAGEMENT

CROSS-REFERENCE TO RELATED APPLICATIONS

This application is a divisional of, and claims priority from, U.S. patent application Ser. No. 13/358,279, filed Jan. 25, 2012, entitled "PROXIMITY BASED DIGITAL RIGHTS MANAGEMENT." The aforementioned patent application is incorporated herein in its entirety.

SUMMARY

A high-level overview of various embodiments of the invention are provided here for that reason, to provide an overview of the disclosure and to introduce a selection of concepts that are further described below in the detailed-description. This summary is not intended to identify key features or essential features of the claimed subject matter, nor is it intended to be used as an aid in isolation to determine the scope of the claimed subject matter. In brief and at a high level, this disclosure describes, among other things, ways to share digital content with network devices based on location and proximity.

The network devices may be connected to a wireless network having at least one base station. The network devices may also include mobile-to-mobile components that may be utilized for a personal area network. In some embodiments, the base station is configured to receive location data from network devices that connect to it via a wireless network. The base station may also receive a request for content. The content may be stored with a second network device proximate to a first network device. The first network device may be the device that communicates with the base station to request the content. In turn, the base station may generate a temporary key for the first network device. The key may be generated based on the location of the first and second network device and the proximity between the first and second network device. The base station may transmit the key and content to the first network device. The key may limit the first network device's ability to interact with content. In some embodiments, the content may be available for a limited number of users or a limited number of uses. The content may also be available only while the first and second network devices are proximate to each other. In other words, for the first network device to interact with the content, the second network device should be within a range of the location associated with the first network device.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
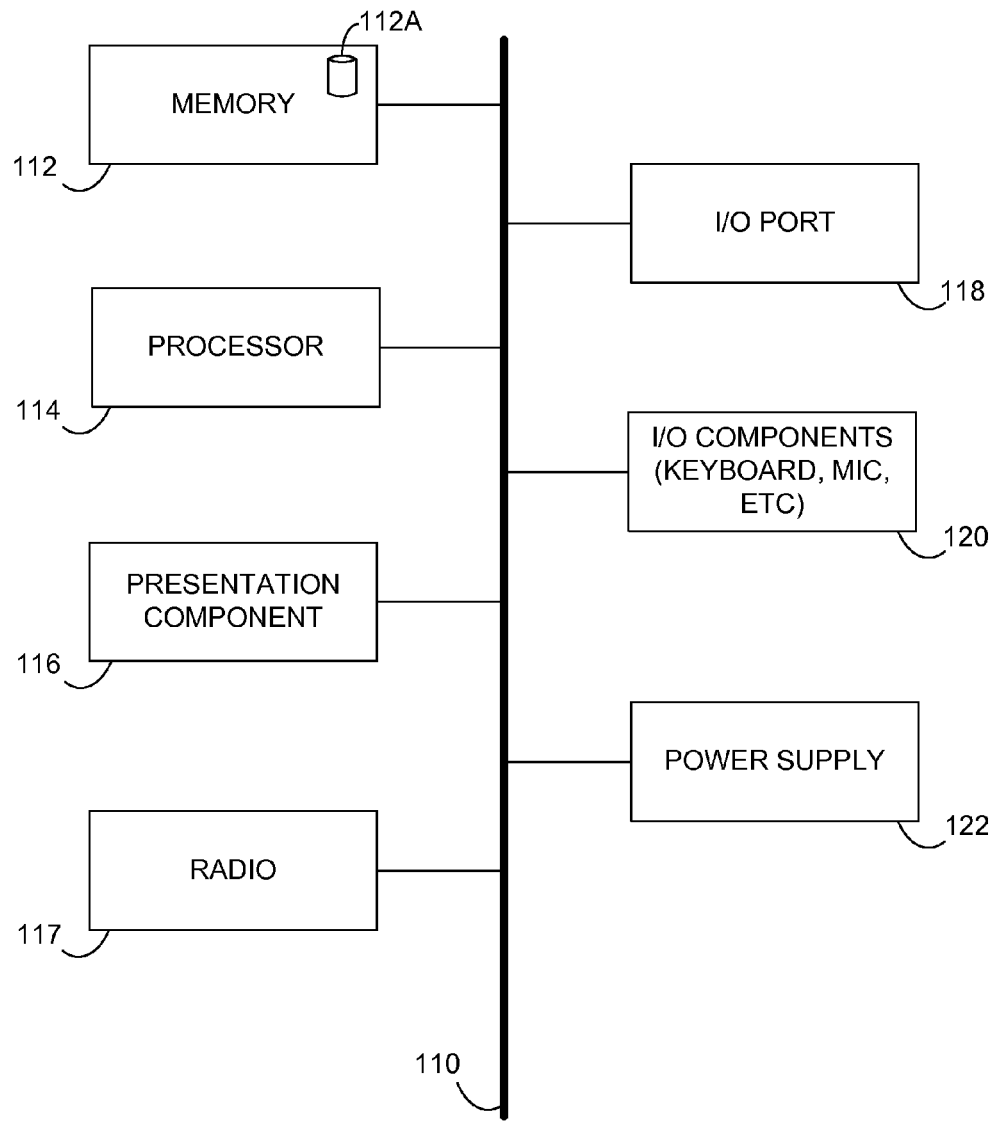
FIG. 1 depicts a block diagram of an exemplary network device in accordance with embodiments of the invention.

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to network devices configured with M2M components. The network devices may include wireless devices, home appliances, washers, dryers, consumer electronics, televisions, digital signs, vending machines, vehicle or shipment tracking devices, digital books, image and video recorders, gaming system, hand-held scanners, etc. The M2M component may include communication interfaces, storage, and processors for executing instructions. The M2M component provides the network devices with access to several communication networks, including a personal area network and wireless network. When connected to the wireless network, a base station is configured to respond to requests from the network devices.

The base station may also be configured to shared protect content based on the location of the network devices or the proximity of the network devices. The M2M component on a first network device may allow a second network device to use content, software, or hardware on another device when the first and second network device are physically close, even if for only a short period of time. The shared protected content or capability, in certain embodiments, may be protected by a digital rights management (DRM) system, which may require a license for each use of the protected content.

Too offset the cost, associated with purchasing or supporting multiple DRM keys or licenses that are rarely, if ever, used, an M2M component on the network device allows each network device in a personal area network to share protected content temporarily when proximate to other devices. The content may include video game, music, and other multimedia content. The content is available temporarily and becomes unavailable when the network device sharing content with the other network devices is not proximate to the other devices.

For instance, a digital media player may be used by one person on an airplane. The person may utilized the media play may to render a specific content (e.g. movie, song, app, etc). An individual having another device, e.g., wireless phone, with media rendering ability and sitting in a chair that is less than a particular distance, e.g., 5 feet away, may be granted temporary viewing privileges to any content that is available on the digital player. The temporary viewing privilege may be available as long as the devices are less than the particular distance from each other. Once either person and their device moves to a location that is greater than the particular distance from each other, the content is no longer allowed to be played on the wireless phone of the individual. In certain embodiments, the M2M components in the digital media player and wireless device may detect proximity between each other. Thus, the digital media player may be configured to communicate the content and temporary keys over a NFC that is only operable while within the particular distance.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

ATM Automated Teller Machine
BTS Base Transceiver Station
CDMA Code Division Multiple Access
CD-ROM Compact Disc, Read Only Memory
DRM Digital Rights Management
DVD Digital Versatile Disc
EEPROM Electrically Erasable Programmable Memory
ESN Electronic Serial Number
GPRS General Packet Radio Service
GPS Global Positioning System
GSM Global System for Mobile communications (Groupe Spécial Mobile)
ID Identifier
IP Internet Protocol
IPv4 Internet Protocol Version Four
IPv6 Internet Protocol Version Six
LED Light Emitting Diode
LTE Long Term Evolution
M2M Machine-to-Machine
NFC Near-Field-Communication
PDA Personal Data Assistant
RAM Random Access Memory
ROM Read Only Memory
RNC Radio Network Controller
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network device is configured with several input and output components. Additionally, an M2M component may be installed in the network device. The M2M component may include applications for communicating with different networks. The M2M component may utilize the input and output component of the network device to implement operations requested by the applications of the M2M component. The M2M component may allow the network device to switch between communication networks maintained by disparate carriers. The network device having the M2M component may also be configured to temporarily share content with other network devices within a proximity of the network device.

FIG. 1 depicts a block diagram of an exemplary network device in accordance with embodiments of the invention. Turning now to FIG. 1, a block diagram of an illustrative network device is provided and referenced generally by numeral 100. Although some components are shown in the singular, they may be plural. For example, network device 100 might include multiple processors or multiple radios, etc. A network device 100 may be one of many devices, including, but not limited to, a wireless phone, vending machine, video and image capture device, digital sign, television, a laptop, a PDA, a handheld device, smart meters, handheld scanners, vehicle tracking components, e-books, ATMs, consumer electronics, etc. As illustratively shown, network device 100 includes a bus 110 that directly or indirectly couples various components together including memory 112, a processor 114, a presentation component 116, a radio 117, input/output ports 118, input/output components 120, and a power supply 122.

We previously have described various memory components what memory 112 might take the form of. Memory component 112 can include any type of medium that is capable of storing information (e.g., a database 112A). The database 112A may be configured to store temporary keys; permanent keys; multimedia content; provisioning credentials, including a network identifier associated with the network device 100; location information based on GPS; and any information that the network device transmits to the wireless network. The database 112A may also store applications, e.g., DRM applications, associated with a M2M component installed on the network device 100. Processor 114 might actually be multiple processors that receive instructions associated with the applications and process the instructions accordingly. Presentation component 116 includes the likes of a display, a speaker, as well as other components that can present information (such as a lamp (LED), or even lighted keyboards) associated with the outputs of applications or other components of the network device 100.

The M2M component utilizes the communication interfaces of network device 100 to communicate with other network devices or a base station on the communication network. In an embodiment, an application on the M2M component reports statistics, including, but not limited to, location, age of wireless device, ESN, signal strength, battery power, usage patterns of the wireless device, etc. The statistics may be stored in the database 112A by the M2M component. Once the statistics are collected, the M2M component may transmit them from the network device 100 to at least one base station on the wireless network. In turn, the base station may determine whether another device is requesting content from the network device 100. If it's determined that a content request is made, the base station may check the locations of each device to ensure that both devices are within a proximity of each other. The network device 100, in certain embodiment, may receive a request for content stored locally in memory 112. In turn, the network device 100 may be configured to generate one or more temporary keys for the content. In an alternate embodiment, the keys may be generated at the base station.

The keys and content may be transmitted from the network device 100 to the other network devices via a personal area network. In other embodiments, the network device 100 may provide the keys to the other network device. In parallel with transmission of the keys by the network device 100, the base station may transmit the content to the other network device. The content may be transmitted over the wireless network. And the keys may be transmitted over the personal area network. Accordingly, the network devices may utilize any combination of the wireless network or the personal area network to deliver content and corresponding keys that allow temporary sharing of the protected content.

The network device 100 may utilize the communication interfaces to deliver the keys and content. The communication interface of the network device 100 may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications, Bluetooth™, Zigbee, or other near-field communication (NFC).

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network device 100. Power supply 122 includes items such as batteries, fuel cells, or any other component that can act as a power source to power network device 100.

Accordingly, a network device 100 may share protected content with other devices. The network device 100 may report statistics to a base station, which may generate temporary keys for the other network device that is requesting the protected content. It will be understood and appreciated by those of ordinary skill in the art that the network device 100 shown in FIG. 1 is merely an example of one suitable network device 100 and is not intended to suggest any limitation as to the scope of use or functionality of the embodiments of the invention. Neither should the network device 100 be interpreted as having any dependency or requirement related to any single component or combination of components illustrated therein. The single unit depictions are meant for clarity, not to limit the scope of embodiments in any form.

In some embodiments, a base station on the wireless network transmits content and temporary keys to network devices that are proximate to a first network device. The first network device stores the content transmitted to the other network devices. The other network devices are granted temporary access to the content while proximate to the first network device. The network devices report the location or network identifier to the base station. In turn, the base station manages accessibility to the content.

Figure 2:
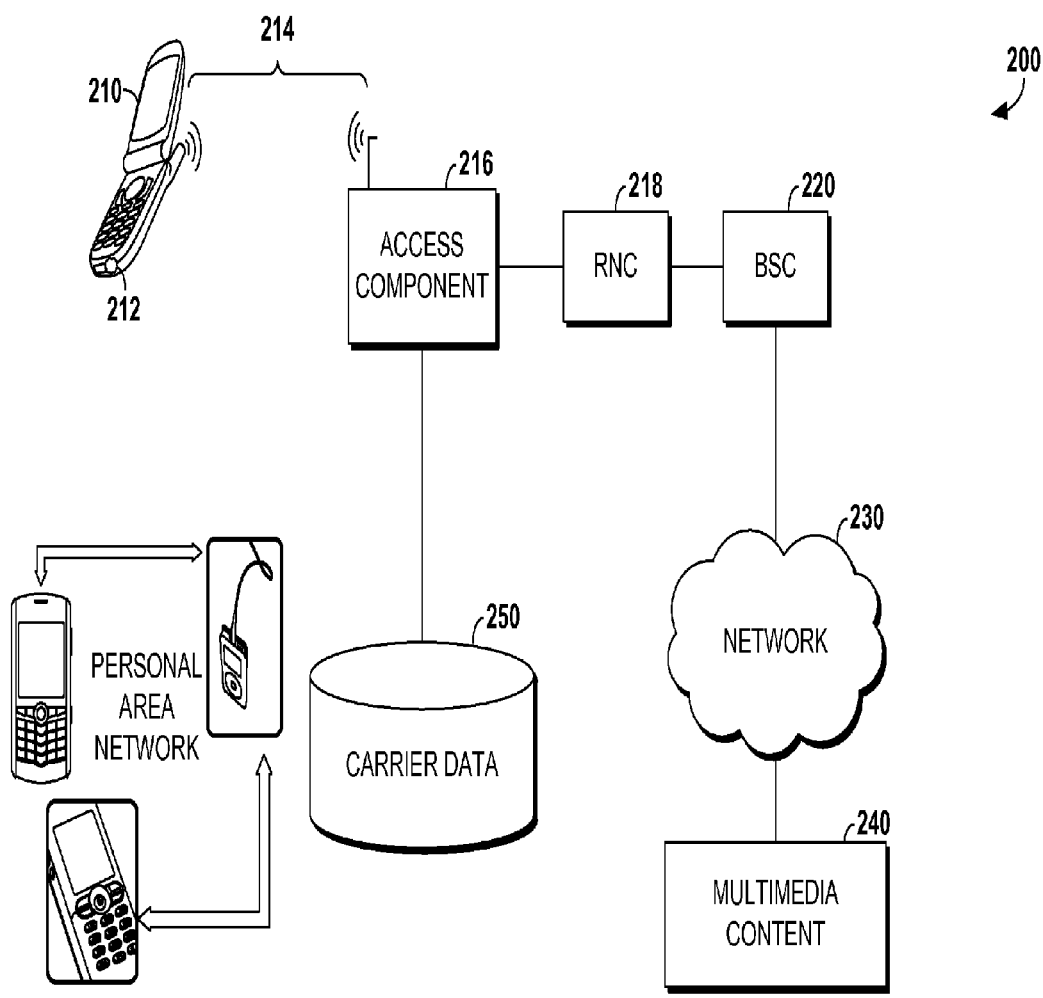
FIG. 2 depicts a network diagram of an exemplary communication system in accordance with embodiments of the invention.

FIG. 2 depicts a network diagram of an exemplary communication system 200 in accordance with embodiments of the invention. Turning now to FIG. 2, an illustrative computing system 200 is provided and referenced generally by the numeral 200, which depicts an illustrative operating environment for identifying at least one network device that could temporarily share content. The computing system 200 may include a network device 210, access components 216, RNC 218, BSC 220, network 230, multimedia content 240, and carrier database 250.

Network device 210 executes a M2M application 212 that shares statistics associated with the device. In one embodiment, the M2M application 212 monitors statistics like a location of the network device, a network identifier for the network device, an age of the network device 210, temporary keys, and usage patterns of the network device 210. In turn, the M2M application 212 may transmit the statistics, like location, to a BSC 220. In some embodiments, the network device 210 may obtain access to protected content based on the temporary keys and the location of the network device. The network device 210 may obtain access to content stored on another network device. In certain embodiments, the network devices may access the content based on a range associated with the network device's near-field channel like Bluetooth or any other personal area network. In other words, a boundary associated with a group of nearby network devices that share protected content may overlap with range for the near-field channel. When any device that is sharing content is within the boundary (e.g. range), it may access any protectable content on the devices in the range. In turn, the other network devices may temporarily receive access to content that is not available to the network devices outside of the range.

Network devices 210 may communicate among themselves over a near-field channel to share content with other network device within range. The network devices may generate the keys for the content and transmit both the content and keys over the NFC to the other network devices that have requested access to the content. In one embodiment, the network device 210 either on-demand or automatically detects the proximity of a nearby acceptable device and allows a specified piece of content or capability to be transferred to the nearby acceptable device along with a temporary DRM key. The DRM key may limit access to the content or capability for a specified time period, until said content or capability is used up, or until said content or capability is closed on the nearby acceptable device. Additionally, the temporary DRM key may automatically expire once the devices are no longer inside a pre-defined proximity limit corresponding to the range. To move from temporary access to permanent access, the nearby acceptable device may purchase, via the wireless network 230, a permanent key and a copy of the content from a provider.

In some embodiments, the database 250 stores statistics monitored by the network device 210. The database 250 stores an identifier for each network device. The identifier may be an ESN or telephone number associated with the network device 210. The database 250 may associate the identifier with the statistics received for the corresponding network device. The statistics may include both device metrics and network metrics. The device metrics include location, age, temperature, battery power, antennae orientation, location, memory usage, etc. The network metrics include signal strength, nearby network devices within the NFC range, interference, bandwidth, ESN, usage patterns etc. Based on a combination of the device and network metrics, the network devices 210 are placed in cooperative regions where content and capabilities may be aggregated. The database 250 may also store, in certain embodiments, network credentials, e.g., router identifiers, for access points of the nearby network devices; and software, video games, or multimedia content available on each of the network devices. The database may be accessed, in at least one embodiment, to identify content available for a network device, content that is not currently stored on the network device, or content that is not currently licensed to the network device.

Network device 210 communicates with an access component 216 by way of a communication link 214. Communication link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network 230. The access component 216 may be one or more of a base transceiver station (BTS) tower, a Wi-Fi Router, and any other device that facilitates communication between network device 210 and network 230. In one embodiment, the access component 216 includes both a Wi-Fi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives statistics from the network devices 210, and controls handovers from one BTS to another BTS. In one embodiment, the BSC 220 may create sharing regions associated with one or more network devices 210 based on the statistics associated with the network devices.

The components illustrated in FIG. 2, such as those that may be included in a wireless communications network 230 comprise network resources and multimedia content 240 accessible via the wireless communications network 230. The wireless communication network 230 may be utilized by the BSC 220 to receive statistics and network credentials (e.g., user name, passwords, private keys, temporary keys, network IDs, etc.) from network devices 210. Some network devices may not store their credentials in the database 250 but retain the data on a local storage only for access by the BSC 220. The network 230 may be an IP network operating one or both of IPv4 and IPv6. The multimedia content 240 may include websites, videos, applications, games, etc. that are accessible by the network devices 210.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

In some embodiments, M2M components of the network devices generate temporary keys for another device that requests access to content. In response to the request for content, the network device may provide a listing of available content to another network device. The other network device may select one item of content and transmit the selection back to the network device. In response, the network device may generate a temporary key and transmit the key and content via the personal area network to the other device.

Figure 3:
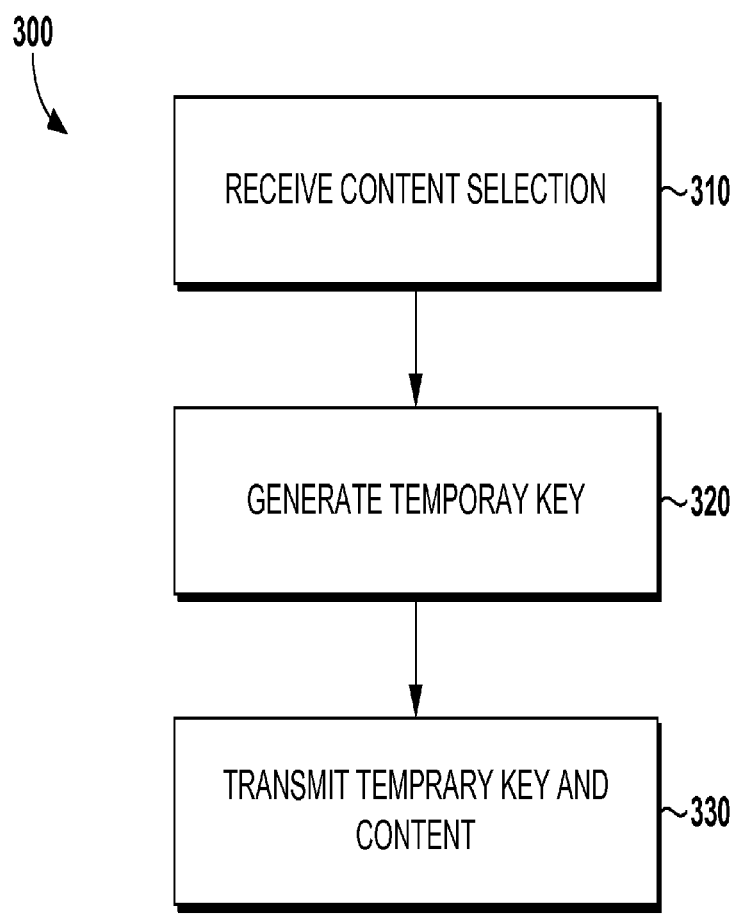
FIG. 3 depicts an exemplary logic diagram for sharing protected content with embodiments of the invention.

FIG. 3 depicts an exemplary logic diagram for sharing protected content with embodiments of the invention. Turning now of FIG. 3, in step 310, an M2M component in the network device may receive a selection of at least one of the available content on a list. The list may be generated by the network device, in one embodiment, upon the first network device receiving a request to share content with at least one other network device. The network device identifies the available content on the first device and generates the list of the available content. In some embodiments, the at least one other network device is proximate to the network device. In turn, the network device transmits the list of the available content to the at least one other network device. The list of the available content from the first network device is displayed in a graphical user interface of the at least one other network device. The content may include, among other things, music, video games, literature, or software.

In other embodiments, the network device may generate a temporary key, in step 320, for the at least one other network device. The temporary key may authorize the at least one other network device to interact with the at least one of the available content included in the selection. The temporary key may include an identifier of an access point shared by the network device and the at least one other device. The temporary key may expire, in one embodiment, when the devices are not within a proximity range. Furthermore, the temporary key may limit a number of times a user can access the content or a number of times a user can copy the content. In step 330, the network device may transmit the at least one of the available content included in the selection and the temporary key to the at least one other network device.

In yet another embodiment, the network device may receive, from the at least one other network device, another list having content available on the other device that is different from the available content on the network device. This list may be utilized by the network device to request temporary access to the content available on the at least one other network device.

As explained above, the network device may be configured to generate temporary keys and share content over a personal area network. The network devices that are within a range of NFC may request access to content stored by any other network in a personal area network. The network devices that are granted temporary access may not view or access the content when outside of the NFC range.

A remote server, e.g., BSC, periodically identifies the network devices on the wireless network that may share multimedia content based on proximity. The identification of the network device may be based on several statistics including, but not limited to: location and content available on the network device. Upon identifying the network devices, the devices on the wireless network may request temporary access to content stored by a nearby device.

Figure 4:
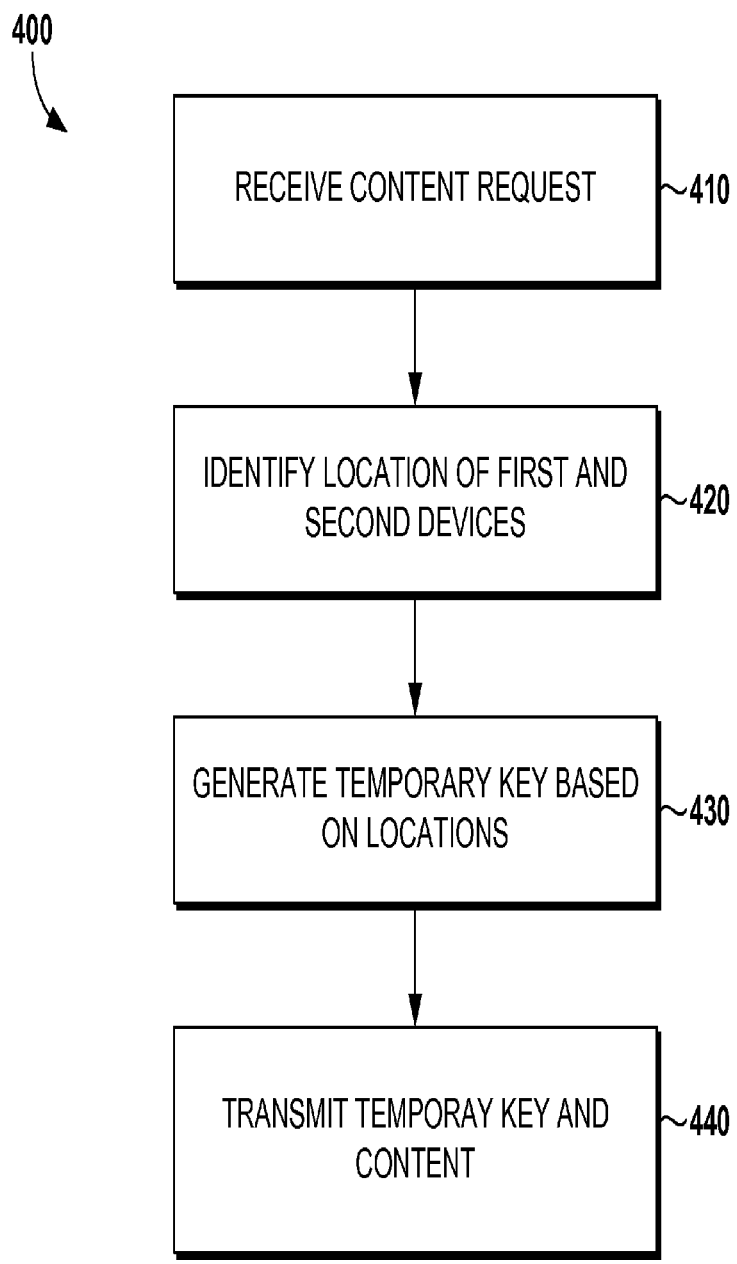
FIG. 4 depicts an exemplary logic diagram for providing content temporarily to a network device in accordance with embodiments of the invention.

FIG. 4 depicts an exemplary logic diagram for providing content temporarily to a network device in accordance with embodiments of the invention. Turning now to FIG. 4, in step 410, the access component, e.g., base station controller, receives a content request from a first network device. The content may be available on a second network device proximate to the first network device. The base station, in step 420, identifies a location of the first network device. And a location of the second network device is also identified by the base station. The base station periodically receives an update of the location of the second network device. In turn, a temporary key is generated, in step 430, by the base station. The temporary key allows the first network device to unlock the content while the first network device is within a range of the location of the first network device and the location of the second network device. In one embodiment, the range is based on an access point, e.g., wireless router, shared by the first network device and second network device. In another embodiment, the range is based on a NFC.

In step 440, the base station may transmit the temporary key and the content to the first network device. The content may include music, video games, literature, or software. The temporary key may limit the number of devices that receive the content. Accordingly, more than two devices may temporarily and simultaneously share content from the second network device.

Thus, when two individuals with gaming systems are nearby, each device may connect to a personal area network or wireless network to browse content on each other's device. One of the individuals may select a game on the other person's gaming system, where that person does not have the game on their gaming system. The base station controller of the wireless network may receive the request for the game. In some embodiments, the base station controller may connect with the content provider for a version of the content. The base station controller may also generate a temporary key for content. In turn, the content may be transmitted to the person's gaming system via the wireless network or a personal area network. The temporary key may be transmitted from the base station controller to the individual's gaming system. The key may be based on an identifier associated with the access point available to each of the gaming systems. A handshake between the gaming systems or between each gaming system and the base station controller may occur periodically to confirm proximity. The person with temporary access may play the game while in proximity, e.g., same network, same router, same location, etc, to the other gaming system. Once proximity is nonexistent, the access to the content expires unless the person purchases a permanent license.

In summary, embodiments of the invention allow network devices to share content. A base station may be configured with storage and a processor that receives a request for content from a first network device. The content may be available on a second network device proximate to the first network device. The base station may identify a location of the first network device and a location of the second network device. In turn, a temporary key may be generated by the base station and transmitted with the content to the first network device. The temporary key allows the first network device to unlock the content while the first network device is within a range of the location of the first network device and the location of the second network device. The temporary key may include an identifier of an access point shared by the first network device and the second network device. The key may expire when the devices are not within a proximity range. It may limit a number of times a user can access the content, a number of times a user can copy the content, or a number of devices that can receive the content.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. One or more non-transitory computer-readable media having computer-executable instructions embodied thereon that, when executed, perform a method of sharing access between network devices, the method comprising:
   determining, by a base station, a proximity based on statistics, wherein the statistics correspond to at least one or more network devices and network metrics;
   identifying, by the base station, a location of a first network device of the at least one or more network devices and a location of a second network device of the at least one or more network devices;
   receiving, by the base station, a request for access to the second network device from the first network device;
   determining, by the base station, whether the location of the first network device and the location of the second network device are within the proximity determined by the base station;
   generating, by the base station, an access key when the first network device and the second network device are within the proximity determined by the base station; and
   communicating, via the base station, the access key to the first network device, wherein the access key enables the first network device to access the second network device, and wherein the access key expires when the first network device and the second network device are not within the proximity determined by the base station.

2. The media of claim 1, wherein at least one or more additional network devices, in addition to the first network device, simultaneously access the second network device.

3. The media of claim 2, wherein the access key is temporary and expires upon a determination by the base station that the first network device, the second network device and the at least one or more additional network devices are no longer within the proximity and wherein the access key limits a number of times the first network device and the at least one or more additional network devices can access content, a number of times the first device and the at least one or more additional network devices can copy the content, or a number of devices that can receive the content from the second network device and the at least one or more additional network devices.

4. The media of claim 2, wherein content protected by a digital rights management system is permanently available to the first network device and the at least one or more additional network devices when a permanent access key is purchased by the corresponding first network device or the corresponding at least one or more additional network devices.

5. The media of claim 2, wherein the base station creates sharing regions based on statistics associated with the first network device, the second network device and the at least one or more additional network devices.

6. The media of claim 2, further comprising:
   providing access to a game or a gaming system content by performing the following:
       receiving, at the base station from one or more network devices, a request for access to a game or gaming system content located on the second network device from the first network device;

determining, at the base station, whether the game or gaming system content is protected by a digital rights management system;

granting access to the game or gaming system content when the game or gaming system content is protected by a digital rights management system, wherein access is granted when the base station has received an indication that permission to access the game or gaming system content has been authorized by a content provider or by connecting the one or more network devices to the content provider and the network device receives authorization from the content provider;

providing a purchase option, via the base station, to the one or more network devices for a permanent access key and a copy of the game or gaming system content when the content is protected by a digital rights management system, wherein the permanent access key includes an indication that permission to access the game or gaming system has been authorized by a content provider;

transmitting, by the base station to the one or more network devices, an access key to the game or gaming system content when access has been granted, wherein the access key grants the one or more network devices access to the game or gaming system content;

providing connectivity among the one or more network devices to facilitate playing the game or gaming system when the one or more network devices and the second network device are within the proximity determined by the base station;

determining, periodically by the base station, whether the one or more network devices and the second network device are within the proximity determined by the base station; and terminating access to the game or gaming system content when the one or more network devices and the second network device are no longer within the proximity determined by the base station, unless a permanent access key or the authorization to the content has been purchased or obtained by the one or more network devices.

7. A computer-implemented method of providing access to network devices having a Machine-to-Machine (M2M) component, the method comprising:

communicating, by a first network device, network device statistics, including location, to a base station;

receiving for display, by the first network device from the base station, a set of one or more network devices available for access by the first network device, wherein each network device of the set one or more network devices is within a proximity to the first network device, the proximity being determined by the base station;

sending, by the first network device to the base station, a request for access to at least one network device of the set of one or more network devices;

receiving, by the first network device from the base station, a response to the request for access to the at least one network device;

receiving, by the first network device from the base station, an access key when the response to the request for access to the at least one network device indicates that access to the at least one network device will be granted, wherein the access key provides the first network device access to the at least one network device, and wherein the access key expires when first network device and the at least one network device are not within the proximity determined by the base station; and receiving, by the first network device, content from the at least one network device.

8. The method of claim 7, wherein at least one or more additional network devices, along with the first network device, simultaneously access the at least one network device.

9. The method of claim 8, wherein the response to the request for access to the at least one network device includes an access key for each of one or more specific content items.

10. The method of claim 8, wherein content protected by a digital rights management system is permanently available to the at least one or more additional network devices and the first network device when a permanent access key is purchased by the corresponding at least one or more additional network devices or the first network device.

11. The method of claim 8, wherein the first network device receives from the base station the proximity, the proximity comprising at least one sharing region determined by the base station based on statistics associated with the at least one or more additional network devices, the first network device and the at least one network device.

12. The method of claim 8, wherein access to the content from the at least one network device includes multimedia content, websites, videos, applications, games, and any other non-protected accessible content.

13. A communication system, the system comprising:

a base station having one or more storage devices and a processor, wherein the processor:

receives an identification of a location of a first network device and a location of a second network device, receive a request for access to the second network device from the first network device, generate an access key that allows for access to the second network device, provide the access key to the first network device when the first network device and second network device are in proximity to one another, wherein the proximity is defined by the base station, and wherein the access key expires when the first network device and the second network device are not within the proximity determined by the base station.

14. The communication system of claim 13, wherein at least one or more additional network devices, in addition to the first network device, simultaneously access the second network device.

15. The communication system of claim 14, wherein the location of the first network device, the location of the second network device and a location of the at least one or more additional network devices is periodically determined by the base station.

16. The communication system of claim 14, wherein the access key is temporary and expires upon a determination by the base station that the at least one or more additional network devices, the first network device and second network device are no longer within the proximity.

17. The communication system of claim 14, wherein content protected by a digital rights management system is permanently available to the at least one or more additional network devices and the first network device when a permanent access key to the content protected by a digital rights management system content is purchased by the corresponding at least one or more additional network devices or the corresponding first network device.

18. The communication system of claim 14, wherein the access key limits a number of times the at least one or more additional network devices and the first network device can access content, a number of times the at least one or more additional network devices and the first network device can copy the content, or a number of devices that can receive the content from the at least one or more additional network devices and the first network device.

19. The communication system of claim 14, wherein the base station obtains content from the second network device and transmits the content to the at least one or more additional network devices and the first network device along with the access key.

20. The communication system of claim 14, wherein the proximity determined by the base station comprises at least one sharing region based on statistics associated with the at least one or more additional network devices, the first network device and the second network device.

* * * * *